Patented Nov. 8, 1927.

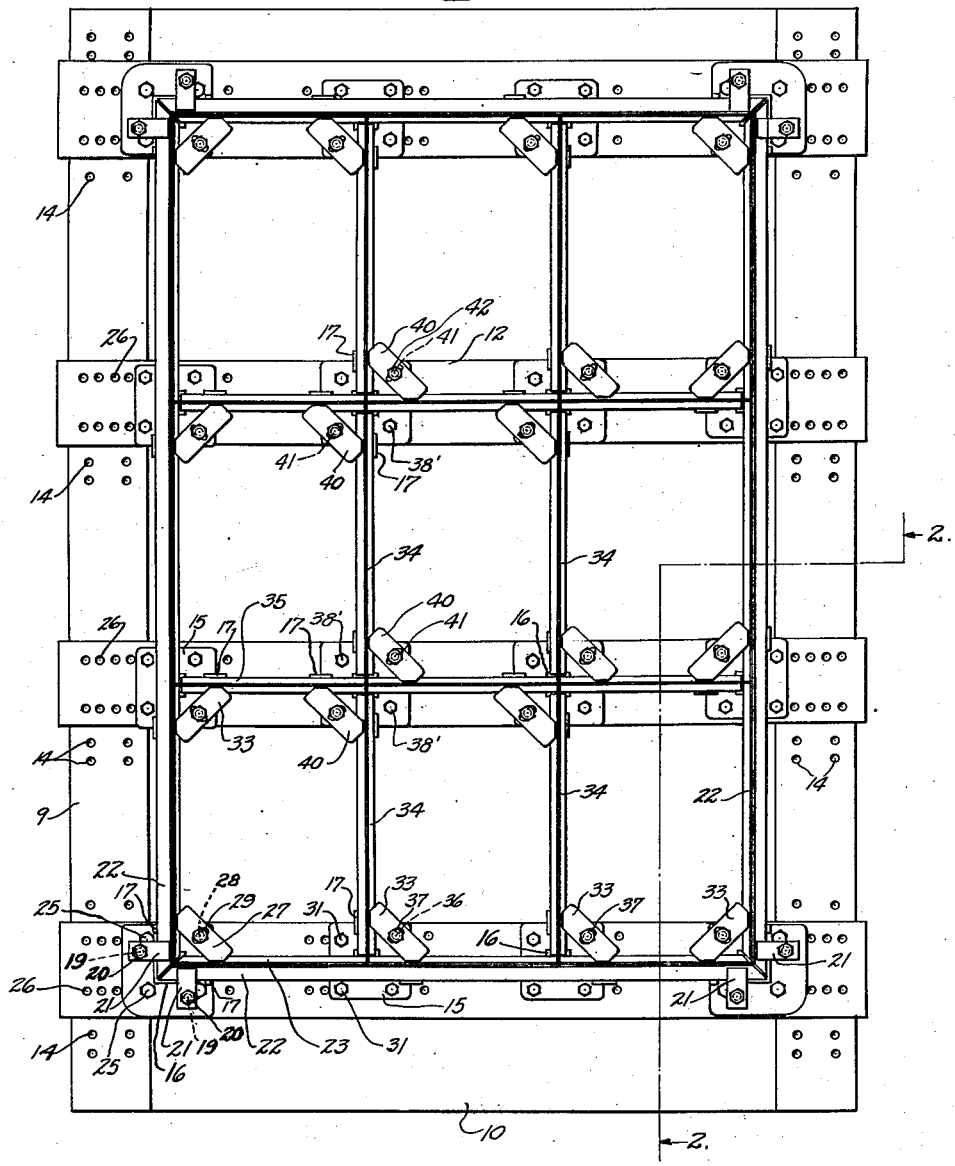

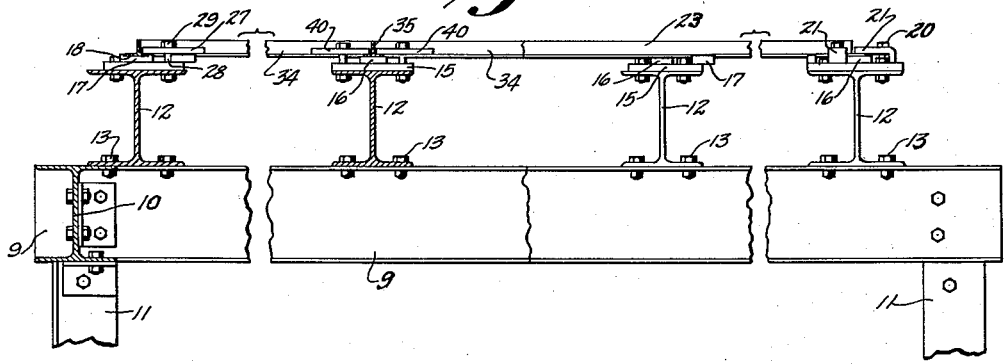
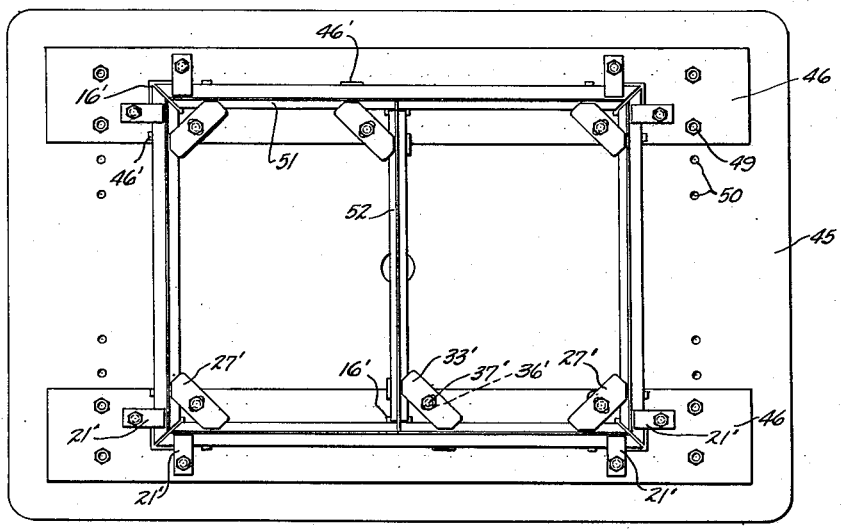
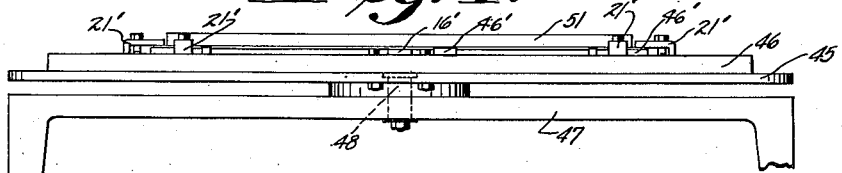

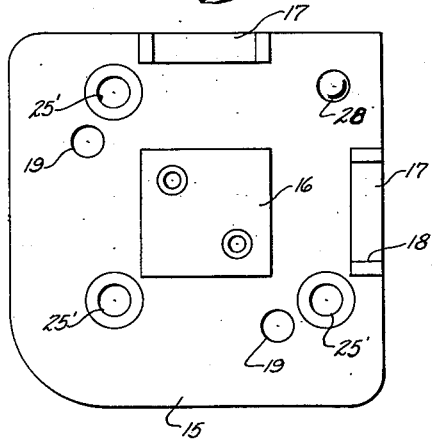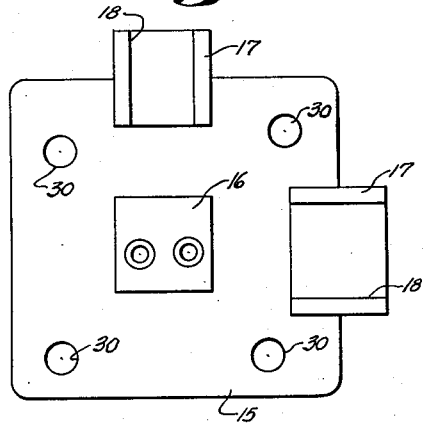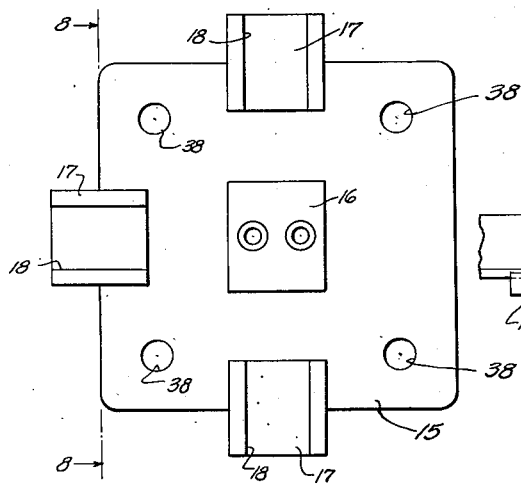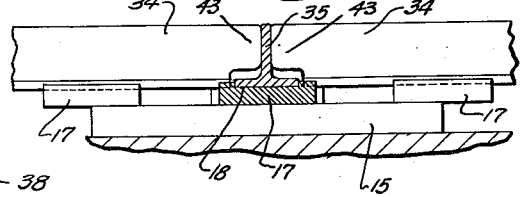

1,648,409

UNITED STATES PATENT OFFICE.

CLARENCE F. KUNEY, OF BROOKFIELD, WISCONSIN, ASSIGNOR TO FEDERAL STEEL SASH COMPANY, OF WAUKESHA, WISCONSIN, A CORPORATION OF WISCONSIN.

SASH-WELDING APPARATUS.

Application filed November 20, 1926. Serial No. 149,688.

The invention relates to metal window sash and more particularly to apparatus used in welding the frame members forming the sash together.

The object of the invention is to provide an apparatus for use in welding metal sash which insures a proper alinement of the sash frame members with a minimum expenditure of time and labor and which puts the sash in condition for ready and efficient welding and which permits of the welding of sash frames of different sizes.

The invention further consists in the several features hereinafter set forth and more particularly defined by claims at the conclusion hereof.

In the drawings Fig. 1 is a plan view of an apparatus embodying the invention showing the sash members in position to be welded;

Fig. 2 is a side elevation view, partly in section, of the apparatus shown in Fig. 1, parts being broken away;

Fig. 3 is a plan view of a modified form of apparatus embodying the invention;

Fig. 4 is a side elevation view of the apparatus shown in Fig. 3;

Fig. 5 is a detail plan view of one of the corner welding plates;

Fig. 6 is a detail plan view of one of the side joint welding plates;

Fig. 7 is a detail plan view of one of the middle joint welding plates;

Fig. 8 is a detail sectional view taken on the line 8—8 of Fig. 1.

In Figs. 1 and 2 of the drawings the numeral 9 designates a pair of supports forming a part of a rigid frame having transverse frame members 10 secured thereto, said frame being supported a suitable distance above the floor by legs 11. A plurality of supports 12 in the form of heavy steel I-bars have their bases detachably secured to the supports 9 by bolts 13 and adjustably spaced relative to each other by providing a series of bolt holes 14 in the support 9, in any one set of which the bolts 13 are inserted. The bars or supports 12 are arranged at right angles to the supports 9 and the surfaces of both said supports are carefully machined so that the top surfaces of the bars 12 lie in the same horizontal plane.

Upon each of the bars 12 are secured the welding plates, some of which are shown in detail in Figs. 5 to 7, inclusive. Each of these welding plates includes a base plate 15 having a chill plate 16 secured thereto and guide members 17 which are in the form of blocks welded, or otherwise suitably secured, to the plate 15, and having a sash-receiving guide channel 18 whose bottom is on a level with the top of the chill plate 16.

The welding plate shown in Fig. 5 is more particularly designed for use at the corners of the sash frame and as shown in Fig. 1 it will be noted that studs 19 are secured to said plate upon which clamps 21 are mounted, said clamps being tightened down against the base portions 22 of the sash frame members 23 by cap-nuts 20, while the base plate itself is clamped to one of the bars 12 by bolts 25 which pass through holes 25' in said plate and through one of a set of holes 26 in the top flange of the bar 12.

The cap-nuts 20 are used to prevent welding material clogging the threads of the stud 19. Another clamping plate 27 may also be used in conjunction with clamps 21 and is diagonally disposed to engage the base flanges on the inner side of the sash frame members 23 and is secured in clamped position by a stud 28 on the plate 15 having a cap-nut 29 engaging the top of said clamp 27.

The welding plate structure shown in Fig. 6 is more particularly designed for use at the sides of the sash frame and as shown in Fig. 1 it will be noted that the holes 30 in said plate are designed to receive bolts 31 which pass through the base plate 15 and pass through one set of one of the series of holes 26 in the bars 12, while a clamping plate 33 is diagonally disposed to engage the base flanges on the inner side of the marginal frame sash member 23 and the sash member such as either the member 34 or 35 extending at an angle thereto, and is secured in clamped position by a stud 36, one of the holes 30 being threaded to receive said stud which has a cap-nut 37 engaging the top of said clamp. As the series of bolt holes 26 in any one of the bars 12 are disposed in spaced parallel relation to each other and the guides of each welding plate are alined relative to each other and the chill plate, when the marginal frame members, such as 23, are clamped in position said members will be accurately held in sash-frame-forming position and because of the adjustment of the bars 12 relative to the fixed support and the welding plate relative to the bars 12 sash frames of different sizes may be readily accommodated and sash light sections of various sizes may be readily secured in assembled position, for example, those formed by the marginal frame members and the frame members 34 and 35.

The welding plate shown in Fig. 7 is more particularly designed for use at the middle joints of the sash frame, and as shown in Fig. 1 it will be noted that one set of holes 38 in said plate are adapted to receive bolts 38' which pass through the base plate 15 and through one set of one series of holes 26 in the bars 12 while the clamping plates 40 are diagonally disposed to engage the base flanges on the inner side of the sash frame members 34 and 35, and are secured in clamped position by studs 41 inserted in the other set of holes 38, threaded to receive said studs, and have cap-nuts 42 engaging the tops of the clamps.

In this construction three guide members 17 are provided, two of these being alined and the other extending at right angles thereto, the one at right angles to Fig. 1 being shown as covered over by the inner edge of the clamping plates 40. Since the plates 15 for the middle joints are adjustably secured to the bars 12 the width of any windowlight section may be readily varied. Thus the adjustable spacing of the bars 12 relative to each other permits the height of the windowlight section to be varied and the adjustable mounting of the welding plates upon the bars 12 permits the width of the windowlight sections to be varied, and these adjustments, of course, permit of holding sash members of different lengths so as to permit assembly of sash of different sizes.

It will also be noted from Fig. 1 that by the proper spacing of the bolt holes in the welding plates to aline with the bolt holes 26 in the bars 12 that all the guide members 17 that take sash members disposed in a horizontal plane are alined and similarly all the guide members 17 on the spaced bars 12 that take the vertically disposed sash members 34 are alined.

In the assembling of sash members the horizontal interior sash members 35 preferably extend all the way across from one side member 23 to the other and each windowlight section is then completed, preferably, by the use of short vertically disposed sash frame members 34 which extend either between the horizontally disposed members 35 or between such a member and the marginal bars 23 of the sash frame. Where a vent section occurs in the interior of the sash the members 35 may extend to one of the frame members of such vent section which instead of being the length of a single window section, such as the member 34, may be as long as the vent section.

The sash frames are usually made up of a combination of angles and T-sections, and as shown in Fig. 8 it will be noted that the members 35 and 34 are both T-bars and that where the same intersect the members 34 have a part of the web formed as a projecting tongue portion 43; similarly, where the web of the T-bars 35 project over the inner base flange of the adjacent side member 23. In making the weld the welding metal is caused to flow into the spaces between the base portions of the bars and between the webs of the bars and, in the case of the interior joints, such as shown in Fig. 8, between the web of a bar and the adjacent base portion of an adjoining bar, so as to permanently unite the sash frame members at the joints, it being noted that when the sash frame members are assembled each of them engage and are held down at the joint against the chill plate 16 to facilitate the making of the weld.

With this construction the assembling of the sash elements preparatory to welding may be done by relatively unskilled labor, after which the welding may be done by relatively unskilled labor since there is no danger of distortion of the sash.

The construction shown in Figs. 1 and 2 is used principally for large sash frames and the operator moves around the support in making the welds, and in case a vent section is used he may also work from the space within the vent section.

Where the sash frame is of small dimensions, such as basement windowsash, the construction shown in Figs. 3 and 4 is employed, which is generally similar to that already described but which permits the operator to work from one position by reason of the fact that the support 45 upon which base plates or bars 46, provided with sash guide channels 46', are adjustably mounted, is itself mounted for rotation upon a table or standard 47 by a vertically disposed pivot shaft 48 secured to the plate 45 and journalled in the table 47. In this form the bars or plates 46 are flat and adjustably clamped in spaced relation to each other upon the plate 45 by bolts 49 that extend through one of a set of threaded holes 50 in the plate. The chill plates 16', similar to the plates 16, are secured to the bars 46 and, as shown, corner clamps 21' and 27', similar to clamps 21 and 27, are secured to the bars 46 and clamps 33' are detachably secured to the bars 46 by studs 36' and nuts 37' so that the marginal frame members 51 and the cross frame member 52 are secured in proper assembled relation for the welder to introduce the welding material between the joints of these members while in assembled position.

From the foregoing description it will be noted that I have provided a welding apparatus wherein the sash frame members may be readily, quickly and accurately assembled in sash-forming position for welding I desire it to be understood that this invention is not to be limited to any specific form or arrangement of parts except in so far as such limitations are specified in the claims or necessitated by the prior art.

What I claim as my invention is:

1. In a sash-welding apparatus for sash composed of angled metal sections including webs and flanges, the combination of a plurality of welding plates, each including a chill plate, means for securing the base flanges of the angled members forming the sash at their joints against the chill plates and in welding position relative to each other, and means for lining up of said sash members in sash-forming position.

2. In a sash-welding apparatus, the combination of a plurality of welding plates, each including a chill plate, means for securing the members forming the sash at their joints against the chill plates and in welding position relative to each other, means for lining up the sash members in sash-forming position, and an adjustable support for said welding plates.

3. In a sash-welding apparatus, the combination of a support having supporting members adjustable relative to each other to accommodate different sized sash, of means associated with said members for lining up the sash members to be welded, chill plates adjustably secured to said supporting members, and means for clamping the sash frame members at their joints against the chill plates while in lined up position.

4. In a sash-welding apparatus for sash composed of angled metal sections including webs and flanges, a welding plate comprising a base member provided with channel guides to receive the base flanges of the sash members and a chill plate at the intersection of the center lines of said guides and means for clamping said members against said chill plate.

5. In a sash-welding apparatus for sash composed of angled metal sections including webs and flanges, a welding plate comprising a base member provided with sash member guides to receive the base flanges of the sash members and a chill plate, and means for clamping the sash members to be welded in the guides and against the chill plate.

6. In a sash-welding apparatus, a welding plate comprising a base member provided with sash member guides extending at an angle to each other and a chill plate, of a diagnally disposed clamping plate secured to said base plate and engaging the angularly disposed sash members to be welded to secure said members in their guides and against the chill plate.

7. In a sash-welding apparatus for sash composed of angled metal sections including webs and flanges, the combination with a rotatable support, of supports adjustably mounted thereon and provided with sash member guides to receive the base flanges of the sash members, chill plates on said supports, and means for clamping the sash members to be welded against said chill plates.

8. In a sash-welding apparatus, the combination of a plurality of welding plates each including sash member guide means and a chill plate, of supporting means upon which said plates are adjustably secured to accommodate different sized sash and sash having windowlight openings of different sizes, and means for clamping the sash members at their joints in assembled position against the chill plates.

9. In a sash-welding apparatus, a welding plate comprising a base member provided with sash member guides, extending at an angle to each other and a chill plate, and means associated with said base members for simultaneously clamping adjoining sash members to be welded against the chill plate.

In testimony whereof, I affix my signature.

CLARENCE F. KUNEY.